(12) United States Patent
Zhu et al.

(10) Patent No.: US 7,567,715 B1
(45) Date of Patent: Jul. 28, 2009

(54) SYSTEM AND METHOD FOR REPRESENTING AND ENCODING IMAGES

(75) Inventors: Song-Chun Zhu, Los Angeles, CA (US); Cheng-en Guo, Los Angeles, CA (US); Ying-Nian Wu, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 980 days.

(21) Appl. No.: 11/128,408

(22) Filed: May 12, 2005

Related U.S. Application Data

(60) Provisional application No. 60/570,385, filed on May 12, 2004.

(51) Int. Cl.
G06K 9/36 (2006.01)
G06K 9/46 (2006.01)
G06K 9/48 (2006.01)
G06K 9/62 (2006.01)

(52) U.S. Cl. .................. 382/232; 382/199; 382/225; 382/243

(58) Field of Classification Search ............... 382/164, 382/171, 173, 180, 190, 199, 202, 225, 232, 382/243, 276
See application file for complete search history.

(56) References Cited

U.S. PATENT DOCUMENTS 7,003,039 B2 * 2/2006 Zakhor et al. .......... 375/240.22
7,023,441 B2 * 4/2006 Choi et al. ................ 345/441
2002/0080139 A1 * 6/2002 Koo et al. ................ 345/473
2003/0076334 A1 * 4/2003 Dumitras et al. .......... 345/582
2005/0191566 A1 * 9/2005 Liu et al. ...................... 430/5
2005/0220355 A1 * 10/2005 Sun et al. .................... 382/254
2006/0045337 A1 * 3/2006 Shilman et al. ............. 382/181

OTHER PUBLICATIONS

Neff et al. ("Very low bit rate video using matching pursuit", SPIE vol. 2308, pp. 47-60, 1994).*
Olshausen et al. ("Sparse coding with an overcomplete basis set: a strategy employed by V1?", Vision Research, vol. 37, No. 23, pp. 3311-3325, 1997).*
A. J. Bell and T. J. Sejnowski, "An Information-maximisation approach to blind separation and blind deconvolultion." *Neural Computation*, pp. 1-38, 1995.

(Continued)

*Primary Examiner*—Yubin Hung
(74) *Attorney, Agent, or Firm*—Christie, Parker & Hale, LLP.

(57) ABSTRACT

A system and method for representing and encoding an input image. Pixels associated with the structural part of the image are referred to as "sketchable," and pixels associated with the texture part are referred to as "non-sketchable." A sketch graph, $S_{sk}$, is generated for the sketchable part of the input image by iteratively selecting a plurality of optimal image primitives from a dictionary of image primitives. The sketch graph may then be refined to achieve good Gestalt organization and resolve ambiguities in the graph. The non-sketchable texture regions of the image, $S_{nsk}$, are computed via a simple texture clustering algorithm. In reconstructing the sketchable part of the input image, the image primitives are aligned on the sketch graph. In reconstructing the non-sketchable part of the input image, the MRF models are simulated to reproduce statistical summaries of the various texture regions using the sketchable part as boundary condition.

27 Claims, 17 Drawing Sheets

OTHER PUBLICATIONS

A. Blake and A. Zisserman, *Visual Reconstruction*. Cambridge, MA. MIT Press, 1987, 225 pgs.

J. R. Bergen, "Theories of Visual Texture Perception", *Spatial Vision*, D. Regan (eds.), CRC Press 1991, pp. 114-134.

E. J. Candes and D. L. Donoho. "Ridgelets: A Key to Higher-Dimensional Intermittency" *Phil. Trans. R. Soc. Lond., A.*, pp. 1-15, 1999.

J. Canny. "A Computational Approach to Edge Detection" *Transactions on Pattern Analysis and Machine Intelligence*, vol. 8:679-698, Nov. 1986, pp. 679-698.

T. Chan and J. Shen, "Mathematical Models for Local Nontexture Inpaintings", *SIAM J. Appl. Math*, vol. 62, No. 3, 2001, pp. 1019-1043.

S. Chen, D. Donoho, and M.A. Saunders. "Atomic Decomposition by Basis Pursuit" *SIAM Journal on Scientific Computing*, 20:33-61, 1999, pp. 1-29.

R. R. Coifman and M. V. Wickhauser. "Entropy-Based Algorithms for Best Basis Selection." *IEEE Trans. on Information Theory*, vol. 38, No. 2, Mar. 1992, pp. 713-718.

T. F. Cootes, G. J. Edwards, and C. J. Taylor. "Active Appearance Models". *Proc. European Conf. on Computer Vision*, vol. 2, Springer, 1998 pp. 484-498.

I. Daubechies, "Orthonormal Bases on Compactly Supported Wavelets", *Communications on Pure and Applied Mathematics*, vol. 41, 1988, pp. 909-996.

R. A. Devore and B. Jawerth and B. J. Lucier, "Image Compression Through Wavelet Transform Coding", *IEEE Transactions on Information Theory*, vol. 38, No. 2, pp. 719-746, 1992.

A. Efros and W. T. Freeman, "Image Quilting for Texture Synthesis and Transfer", Proceedings *SIGGRAPH 01*, 2001, 8 pgs.

J. H. Elder and S. W. Zucker, "Local Scale Control for Edge Detection and Blur Estimation" *IEEE Transactions on Pattern Analysis and Machine Intelligence*, vol. 20, No. 7, 1998, pp. 699-718.

B. Frey and N. Jojic. "Transformed Component Analysis: Joint Estimation of Spatial Transformations and Image Components" *IEEE Int'l Conference on Computer Vision*, 1999, 8 pgs.

A. Fridman, "Mixed Markov Models", *Ph.D. Thesis*, Department of Mathematics, Brown University, May 2000, 62 pgs.

S. Geman and D. Geman. "Stochastic Relaxation, Gibbs Distributions and the Bayesian Restoration of Images." *IEEE Transactions on Pattern Analysis and Machine Intelligence*, vol. 6, 1984, pp. 721-741.

C. E. Guo, S. C. Zhu, and Y. N. Wu. "Visual Learning by Integrating Descriptive and Generative Methods", *Proceedings on the International Conference on Computer Vision*, 2001, pp. 1-8.

C. E. Guo, S. C. Zhu, and Y. N. Wu, "Modeling Visual Patterns by Integrating Descriptive and Generative Methods", *International Journal of Computer Vision*, 2002,. pp. 1-39.

D. J. Heeger and J. R. Bergen, "Pyramid-Based Texture Analysis/ Synthesis", *Computer Graphics Proceedings*, 1995, pp. 229-238.

B. Julesz, "Visual Pattern Discrimination" *IRE Transactions on Information Theory*, IT-8, Feb. 1962, pp. 84-92.

B. Julesz, "Textons, the Elements of Texture Perception, and their Interactions", *Nature*, vol. 290, Mar. 1981, pp. 91-97.

K. Koffka, *Principles of Gestalt Psychology*, 1935, pp. 106-177.

J. Malik and P. Perona, "Preattentive Texture Discrimination with Early Vision Mechanisms", *Optical Society of America*, vol. 7, No. 5, 1990, pp. 923-932.

S. Mallat and Z. Zhang, "Matching Pursuit with Time-Frequency Dictionaries", *IEEE Sig. Proceedings*, vol. 41, 1993, pp. 3397-3415.

D. Marr, *Vision a Computational Investigation into the Human Representation and Processing of Visual Information*, W. H. Freeman and Company, 1992, pp. 41-99.

D. Mumford and J. Shah, "Optimal Approximations by Piecewise Smooth Functions and Associated Variational Problems" *Communications on Pure and Applied Mathematics*, vol. 42, No. 5, 1989, pp. 577-685.

B. A. Olshausen and D. J. Field, "Emergence of Simple-cell Receptive Field Properties by Learning a Sparse Code for Natural Images," *Nature*, vol. 381, pp. 607-609, 1996.

A. Pece, "The Problem of Sparse Image Coding," *Journal of Mathematical Imaging and Vision*, vol. 17, No. 2, 2002, pp. 1-35.

J. Romberg, H. Choi, R. Baraniuk, "Bayesian Tree-Structured Image Modeling Using Wavelet Domain Hidden Markov Models", *IEEE Transactions on Image Processing*, vol. 10, No. 7, , Jul. 2001, 14 pgs.

E.P. Simoncelli, W.T. Freeman, E.H. Adelson, and D.J. Heeger, "Shiftable Multiscale Transforms", *IEEE Transaction. on Information. Theory*, vol. 38, No. 2, 1992, pp. 587-607.

Z. W. Tu and S. C. Zhu, "Image Segmentation by Data-Driven Markov Chain Monte Carlo," *IEEE Transactions on Pattern Analysis and Machine Intelligence*, vol. 24, No. 5, 2002, pp. 657-673.

Y. N. Wu, S. C. Zhu, and X. Liu "Equivalence of Julesz and Gibbs Ensembles", *Procedures of ICCV*, Corfu, Greece, 1999, 8 pgs.

S. C. Zhu, C. E. Guo, Y. Z. Wang, and Z. J. Xu, "What are Textons?" *International Journal of Computer Vision*, vol. 62(1-2), Apr./May 2005, pp. 1-33.

S. C. Zhu, Y. N. Wu, and D. Mumford, Minimax Entropy Principle and Its Applications in Texture Modeling, *Neural Computation*, vol. 9, No. 8, 1997, pp. 1-38.

\* cited by examiner

| operators | graph change | illustration | |
|---|---|---|---|
| $O_1, O'_1$ | create / remove a stroke | ⇕ | •—• |
| $O_2, O'_2$ | grow / shrink a stroke | •—• ⇕ •—•—• | |
| $O_3, O'_3$ | connect / disconnect vertices | Y ⇕ Y-shape with extra | |
| $O_4, O'_4$ | extend one stroke and cross / disconnect and combine | •—•—•  •—• ⇕ •—⊤—• | |
| $O_5, O'_5$ | extend two strokes and cross / disconnect and combine | •—• •—• ⇕ •—⊤—• •—• | |
| $O_6, O'_6$ | combine two connected strokes / break a stroke | •—• ⇕ •—•—• | |
| $O_7, O'_7$ | combine two parallel strokes / split one into two parallel | ‖ ⇕ ‖ | |
| $O_8, O'_8$ | merge two vertices / split a vertex | X ⇕ X | |
| $O_9, O'_9$ | create / remove a blob | ⇕ ● | |
| $O_{10}, O'_{10}$ | switch between a stroke(s) and a blob | ● ⇕ •—• | |

FIG. 12

SYSTEM AND METHOD FOR REPRESENTING AND ENCODING IMAGES

CROSS-REFERENCE TO RELATED APPLICATION(S)

This application claims the benefit of U.S. Provisional Application No. 60/570,385 filed on May 12, 2004, the content of which is incorporated herein by reference.

STATEMENT REGARDING FEDERALLY SPONSORED RESEARCH/DEVELOPMENT

This invention was made with Government support under Grant Nos. 0222467 and 9877127, awarded by the National Science Foundation (NSF). The Government has certain rights in this invention.

BACKGROUND OF THE INVENTION

In the early, preattentive stage of visual perception, an image may be divided into two components: (1) a structural part with distinguishable elements such as image borders and other noticeable features; and (2) a textural part without distinguishable elements. For example, in the image illustrated in FIG. 1, the structural parts are objects at near distance, such as tree trunks and branches, whose positions and shapes can be clearly perceived. In contrast, the textural part are objects at far distance whose structures become indistinguishable and simply yield different texture impressions.

Currently, there are two prevailing mathematical theories for image modeling. One is a generative theory such as the wavelet/sparse coding theory that seeks to explain an image in terms of image bases. The other is a descriptive theory such as the Markov random field (MRF) theory that seeks to explain an image in terms of filters.

Specifically, the wavelet/sparse coding theory represents images by elements selected from a dictionary of image bases that may include wavelets and ridgelets as is described by Candes et al., "Ridgelets: a Key to Higher-Dimensional Intermittency?" *Phil. Trans. R. Soc. Lond. A.,* 357:2495-509, 1999, and Chen et al., "Atomic Decomposition by Basis Pursuit," *SIAM Journal on Scientific Computing,* 20:33-61, 1999, the contents of which are incorporated herein by reference.

For example, if I is an image defined on a lattice $\Lambda$, the wavelet/sparse coding theory assumes that I is the weighted sum of a number of image bases $B_k$ indexed by k for its position, scale, orientation, and the like. Thus, a "generative model" may be obtained as defined by:

$$I = \sum_{k=1}^{K} c_k B_k + \epsilon, \ B_k \in \Delta_B, \ C = \{c_k\} \sim p(C) \tag{1}$$

$B_k$ is selected from a dictionary $\Delta_B$, $c_k$ are the coefficients, p(C) is the super-Gaussian distribution of coefficients C, ~p(C) means that C follows the distribution p(C), and $\epsilon$ is the residual error modeled by a Gaussian white noise. Thus, the wavelet/sparse coding theory assumes a linear additive model where the image I is the result of linear superposition of $B_k$, k=1, ... K, plus the Gaussian white noise $\epsilon$.

FIG. 2A illustrates a typical dictionary $\Delta_B$ used for sparse coding that includes Gabor and Laplacian of Gaussian (LoG) bases which are well known in the art. FIG. 2B illustrates an input image to which sparse coding is applied. FIG. 2C illustrates the image reconstructed via sparse coding with K=300 bases selected from the dictionary $\Delta_B$ illustrated in FIG. 2A. FIG. 2D is a symbolic representation of the input image where each base $B_k$ is represented by a bar at the same location, with the same elongation and orientation. Isotropic LOG bases are represented by a circle.

The example of FIGS. 2A-2D illustrate that the bases generally capture the image structures where the intensity contrasts are high. However, there are three obvious shortcomings of using a generative model such as wavelet/sparse coding alone. First, the object boundaries are blurred due to each pixel in the image being explained by a multiple number of bases instead of a single base.

Second, the textures are not well represented. One may continue to add more bases to code texture, but this will result in a non-sparse representation with a large K.

Third, the bases, as illustrated in FIG. 2D, do not line up very well in terms of spatial organization. A stronger model for regulating the spatial organization is needed to render more meaningful sketches.

The second theory for image modeling is the descriptive model that includes a FRAME (Filters, Random fields, And Maximum Entropy) model based on the MRF theory, described in further detail by Zhu et al., "Minimax Entropy Principle and Its Applications in Texture Modeling," *Neural Computation,* 9(8), 1627-1660, 1997, the content of which is incorporated herein by reference. The MRF theory represents a visual pattern by pooling the responses of a bank of filters over space. The statistics of the responses define a so-called Julesz ensemble, which is described in further detail by Wu et al., "Equivalence of Julesz and Gibbs Ensembles," *Proc. of ICCV,* Corfu, Greece, 1999, the content of which is incorporated herein by reference. The Julesz ensemble may be deemed to be a perceptual equivalence class where all images in the equivalence class share identical statistics and thus, render the same textural impression.

One problem with using the descriptive method alone is that it is ineffective in synthesizing sharp features, like shapes and geometry (i.e. the sketchable features). Another drawback is the computational complexity when filters of large window sizes are selected for sketchable features.

Accordingly, what is desired is a generic image model that combines the advantages of the generative and descriptive models to effectively and efficiently represent both structures and texture in a seamless manner.

SUMMARY OF THE INVENTION

According to one embodiment, the present invention is directed to a system and method for reconstructing an input image including a sketchable portion and a non-sketchable portion. The input image is received under control of a computer. A plurality of optimal image primitives are iteratively selected from a dictionary of image primitives and a sketch graph of the sketchable portion of the image is generated. The sketch graph is automatically edited for resolving ambiguities. One or more texture regions associated with the non-sketchable portion of the image are also obtained, and statistical summaries associated with the one or more texture regions are extracted. The image is then automatically reconstructed based on the sketch graph and the extracted statistical summaries, and output under control of the computer.

According to one embodiment of the invention, the sketchable portion is a structural portion of the image, and the non-sketchable portion is a texture portion of the image.

According to one embodiment of the invention, the generating of the sketch graph includes generating a proposal sketch map, and iteratively generating strokes on the sketch graph based on the proposal sketch map. The proposal sketch map may be generated by detecting edges of the input image, and tracing along the edge to generate a line.

According to one embodiment of the invention, the generating of the strokes on the sketch graph includes selecting a candidate primitive from the dictionary, determining an image coding length gain associated with the candidate primitive, and accepting or rejecting the candidate primitive based on the determination.

According to one embodiment of the invention, each of the plurality of optimal image primitives is associated with geometric and photometric properties. The sketch graph may be composed based on the geometric properties. Furthermore, the image primitives in the dictionary may be indexed based on the geometric properties.

According to one embodiment of the invention, a single image primitive represents a single pixel of the input image.

According to one embodiment of the invention, the editing of the sketch graph includes applying a graph operator to a line segment on the sketch graph having an open end, determining an image coding length gain associated with the graph operator, and accepting or rejecting a change provided by the graph operator based on the determination.

According to one embodiment of the invention, the graph operator connects two line segments in the sketch graph.

According to one embodiment of the invention, each texture region is generated via a clustering of a plurality of filter responses generated based on the input image.

According to one embodiment of the invention, the non-sketchable portion of the image is synthesized via a texture model using the sketchable portion of the image as a boundary condition.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 7A-7F illustrate an example of generating a synthesized image from an input image according to one embodiment of the invention;

FIG. 12 depicts a table that summarizes a set of reversible graph operators according to one embodiment of the invention;

DETAILED DESCRIPTION

Figure 1:
FIG. 1 is an illustration of an exemplary input image with a structural portion and a textural portion.

It is common for various disciplines associated with image representation and recognition to pursue a probability model to characterize a set of images (or signals) I. In fact, an objective in image modeling is to seek a probability model $p(I)$ of image I that approaches an underlying frequency $f(I)$ of the natural image ensemble, so as to minimize a well known Kullback-Leibler divergence or maximum likelihood estimator (MLE) on a sufficient large image lattice $\Lambda \rightarrow Z^2$.

$$p^* = \arg\min_{\Omega} KL(f\|p) = \arg\max_{\Omega} \log p(I), I \sim f(I) \quad (2)$$

In equation (2), $I \sim f(I)$ means that natural images I follow a frequency $f(I)$, and a model p is pursued in a series of nested probability families which are general enough to approximate f to any precision by learning from a large set of natural images.

$$\Omega_0 \subset \Omega_1 \subset \ldots \Omega_K \rightarrow \Omega_f$$

In general terms, the present invention is directed to a system and method for generating a probability image model, referred to as a primal sketch model, for representing a natural image via an integration of two modeling components which augment the probability family $\Omega$.

The first modeling component explains the structural part of an image, such as, for example, object boundaries and other distinctive features, via a generative model that uses a dictionary of image primitives. The second modeling component models the remaining textural part of the image with no distinguishable elements during preattentive vision, via a descriptive model, such as, for example, the MRF model.

The primal sketch model allows the distinguished features of the input image to be explained via the generative model that uses hyper-sparse image primitives. This allows the texture (without distinguishable structures) to be modeled and synthesized easily with a reduced number of filters of small window sizes. The resulting primal sketch model produces a meaningful parsimonious image representation based on the structural portion of the image. With the addition of textures, the primal sketch model provides a mid-level generic representation of the image useful for various visual tasks. It should be apparent that the computed primal sketch may be used in a number of applications that includes, but is not limited to extremely low bit rate lossy image coding, automatic cartoon generation, non-photorealistic image rendering (e.g., for cellular phones and video phones), and the like.

According to one embodiment of the invention, an artist's notion is adopted by referring pixels associated with the structural part of the image as "sketchable," and pixels associated with the texture part as "non-sketchable." Thus, given an input image I defined on a lattice $\Lambda$, the image lattice may be defined as follows:

$$\Lambda=\Lambda_{sk}\cup\Lambda_{nsk}, \Lambda_{sk}\cap\Lambda_{nsk}=\emptyset \tag{3}$$

As used in equation (3), $\Lambda_{sk}$ is the sketchable part and $\Lambda_{nsk}$ is the non-sketchable part.

The primal sketch representation divides the sketchable part of the image from the non-sketchable part, and separately represents each according to the below equations.

First, the sketchable part of the image is represented by dividing the sketchable part into a number of disjoint image patches, with each image patch being fitted by an image primitive that is selected from a predefined dictionary of primitives as follows:

$$\Lambda_{sk}=\cup_{k=1}^{K}\Lambda_{sk,k}, \Lambda_{sk,k_1}\cap\Lambda_{sk,k_2}=\emptyset, k_1\neq k_2 \tag{4}$$

As used in equation (4), k=1, ... K and indexes a particular selected image primitive. Furthermore:

$$\text{image primitive}=(\theta_{topological}, \theta_{geometric}, \theta_{photometric}) \tag{5}$$

As indicated in equation (5), each primitive may be described in parametric form with topological (degree of connectivity/arms), geometric (positions, orientations, and scales), and photometric (contrast and blurring) attributes. The image primitive that best fits the image patch in terms of these attributes are selected to represent this portion of the image.

Figure 3:
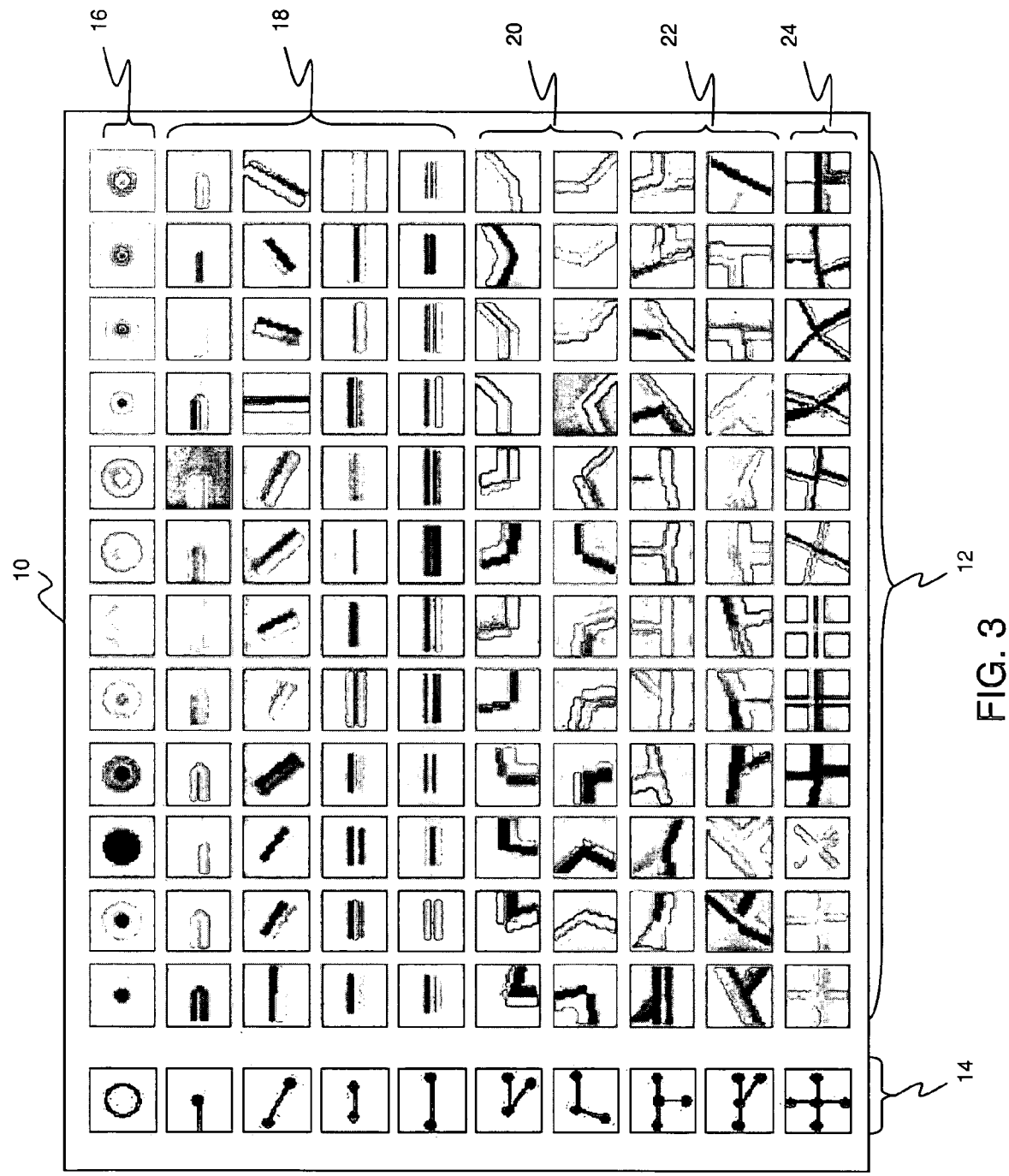
FIG. 3 is an exemplary dictionary of primitives used to represent the sketchable portion of an input image according to one embodiment of the invention.

FIG. 3 is an exemplary dictionary of primitives 10 used to represent the sketchable portion of an input image according to one embodiment of the invention. The illustrated dictionary includes five types of primitives with 0 to 4 axes/arms for connecting with other primitives. The illustrated primitives include blobs 16 with no arms, end points (terminators) 18 with one arm, edges/ridges/multi-ridges/corners 20 with two arms, junctions 22 with three arms, and crosses 24 with four arms. A person of skill in the art should recognize that the dictionary may include other types of primitives for dealing with special types of images, and is not limited to only the primitives illustrated herein. For example, a more dedicated dictionary of primitives may be generated for modeling face, hair, clothing, and the like.

The topological and geometric attributes of each primitive is represented via a center landmark 14 on the image patch which serves as an index to different primitive types. The photometric attribute of each primitive is represented via a photometric representation 12 of the primitive. If the primitive type has an arm, the photometric property is represented by the intensity of the arm profile as is discussed in further detail below.

According to one embodiment of the invention, the probability distributions of the topological, geometric, and photometric attributes of the various primitives are learned from each image synthesis exercise in an offline learning process.

According to one embodiment of the invention, the landmarks of the selected image primitives are used to form a sketch graph $S_{sk}$ defined as follows:

$$S_{sk}=(K,(\Lambda_{sk,k},B_k,a_k), k=1, 2, \ldots, K) \tag{6}$$

As used in equation (6), $B_k$ is an image patch 14 corresponding to primitive k where each primitive is a vertex in the sketch graph, and $a_k$ is an address variable pointing to the neighbors of the vertex $S_{sk,k}=(\Lambda_{sk,k}, B_k)$ defined by the primitive.

The following generative image model is thus adopted for the sketchable part of the image.

$$I_{\Lambda_{sk,k}}=B_k+n, k=1, 2, \ldots, K \tag{7}$$

where n is the residual image. This generative image model different from the linear additive model in the prior art. The primitives in the described generative image model are occluding image patches rather than linear additive bases as in the prior art. In other words, a single image patch is used to represent a single pixel instead of using overlapping bases.

Second, the non-sketchable part of the input image is represented by dividing the non-sketchable part into a small number (e.g. M=3~7) of disjoint homogeneous texture regions. The texture regions are obtained by clustering filter responses as follows:

$$\Lambda_{nsk}=\cup_{m=1}^{M}\Lambda_{nsk,m}, \Lambda_{nsk,m_1}\cap\Lambda_{nsk,m_2}=\emptyset\ m_1\neq m_2 \tag{8}$$

Each texture region is associated with its texture statistics, that is, histograms of responses from a predefined set of filters, identified by $h_{mi}$, where m=1, 2, ..., M, and i=1, 2, ..., n. The texture statistics are texture impressions, and characterize the macroscopic properties of a texture pattern. The model learns the Lagrange parameters $\beta_{mi}$ for the statistics $h_{mi}$ according to conventional mechanisms. We denote the texture region labeling by $$S_{nsk}=(M,(\Lambda_{nsk,m},h_{mi}\leftrightarrow\beta_{mi})\ m=1, 2, \ldots M, i=1, 2, \ldots, n) \tag{9}$$

Based on the above equations, the probability model for the primal sketch representation may be described as follows:

$$p(I_\Lambda, S_{sk}, S_{nsk}) = \frac{1}{Z}\exp\left\{-\frac{1}{2\sigma_0^2}\sum_{k=1}^{K}\sum_{(u,v)\in\Lambda_{sk,k}}(I(u,v)-B_k(u,v))^2 - \sum_{m=1}^{M}\sum_{i=1}^{n}\langle\beta_{mi}, h_i(I_{\Lambda_{nsk,m}})\rangle - E(S_{sk}) - E(S_{nsk})\right\} \tag{10}$$

As used in equation (10), $E(S_{sk})$ and $E(S_{nsk})$ are prior energy functions defined on respectively the sketch graph $S_{sk}$ and texture regions $S_{nsk}$. According to one embodiment of the invention, $E(S_{sk})$ is a mixed random field for the Gestalt organization of the sketch graph. The mixed random field is a descriptive model for the spatial arrangement of the primitives in the sketch graph $S_{sk}$. The mathematical concepts of mixed random fields are described in further detail by Friedman, "Mixed Markov Models," Ph.D. Thesis, Department of Mathematics, Brown University, 2000. The Gestalt organization of primitives with mixed random fields are described by Guo et al., "Modeling visual patterns by integrating descriptive and generative models," *International Journal of Computer Vision*, 53(1), 5-29, 2003, the content of which is incorporated herein by reference.

Figure 4:
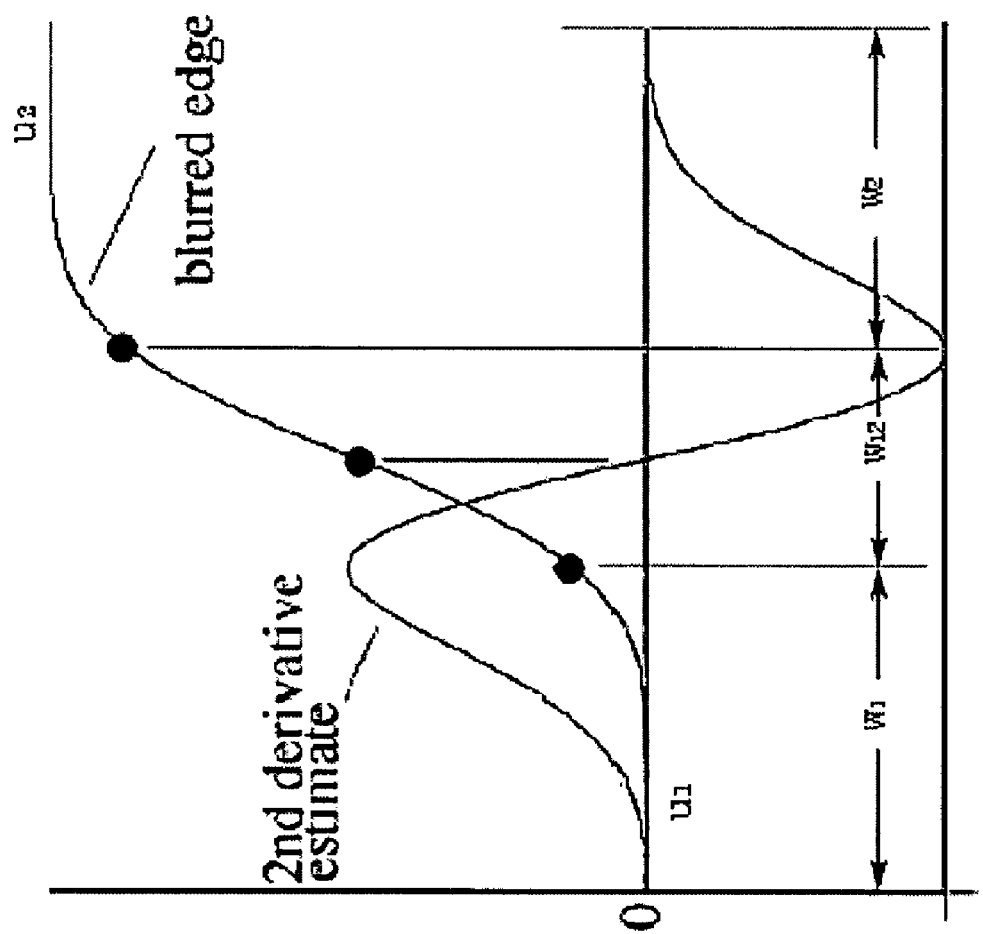
FIG. 4 illustrates parameters used to model intensity of edge profiles according to one embodiment of the invention.

As discussed above, the primitives in the dictionary of primitives 10 are each represented by topological, geometric, and photometric parameters. The photometric parameters collect the intensity profiles of the arms of the primitive. For example, for the edge profiles, five parameters (u1, u2, w1, w12, w2) are used to model their intensity as illustrated in FIG. 4. The five parameters respectively denote the left intensity, right intensity, width of the left intensity, (from the leftmost to the left extreme of the second derivative), blurring scale, and width of the right intensity. The total width of the edge is W=w1+w12+w2. According to one embodiment of the invention, the intensity in-between is modeled by a Gaussian cumulative density function model which is well known in the art, and a look-up table is built for computational efficiency.

Figure 5:
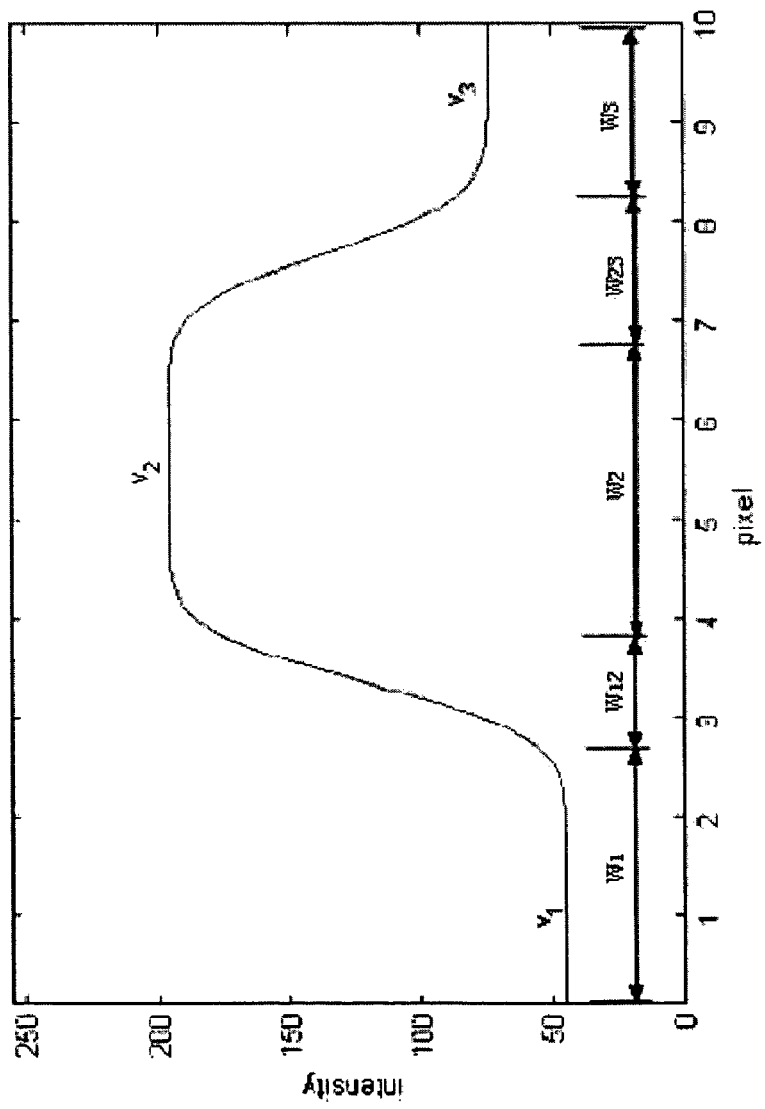
FIG. 5 illustrates parameters used to model intensity of edge profiles according to one embodiment of the invention.

According to another example, the photometric property of a ridge (bar) profile is modeled using eight parameters: (v1, v2, v3, w1, w12, w2, w23, w3) as is illustrated in FIG. 5. A segment with a constant intensity value (e.g. v1, v2, or v3) is referred to as a flat segment. A person of skill in the art should recognize that the photometric representation of FIG. 5 may be extended to multi-ridges that have more than three flat segments.

Figure 6:
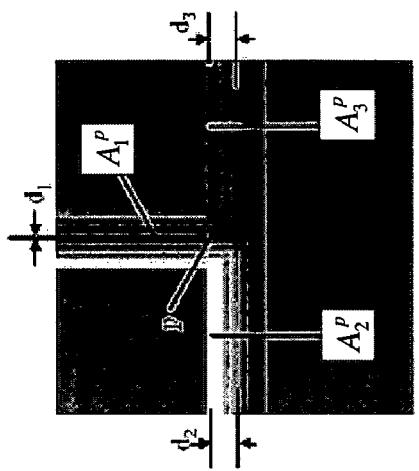
FIG. 6 illustrates a T-junction according to one embodiment of the invention.

For a primitive such as, for example, a T-junction illustrated in FIG. 6, the arms may overlap at the center of the primitive. For such primitives, the intensities on the overlapping area interpolate the intensities of the arms. Specifically, for a pixel p, suppose it is covered by L arms, and the intensity functions for the arms are B1, B2, ..., BL. If we denote the intensities of the profiles at this pixel p as $A_1^p, A_2^p, \ldots, A_L^p$, and the distances from the point p to the center line of each arm is respectively d1, d2, ..., dL, the interpolated intensity is a weighted sum:

$$B_k(p) = \frac{1}{D} \sum_{l=1}^{L} \frac{A_l^p}{d_l + 1} \qquad (11)$$

where $$D = \sum_{l=1}^{L} \frac{1}{d_l + 1}.$$

In the example illustrated in FIG. 6, for a pixel p, each stroke contributes the intensity of $A_1^p$, $A_2^p$, and $A_3^p$ respectively. Thus, according to the above equation, the interpolated intensity for pixel p is the weighted sum of the three intensities. In the illustrated example, d1=0 since p is at the center line of arm B1.

Figure 7A:
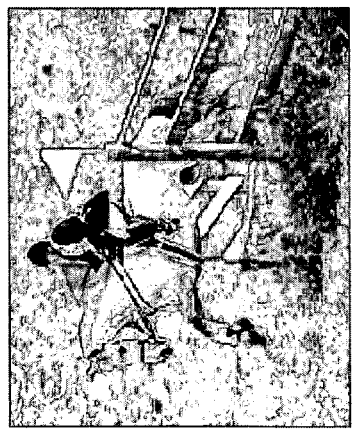
FIG. 7A illustrates an exemplary input image.
Figure 7B:
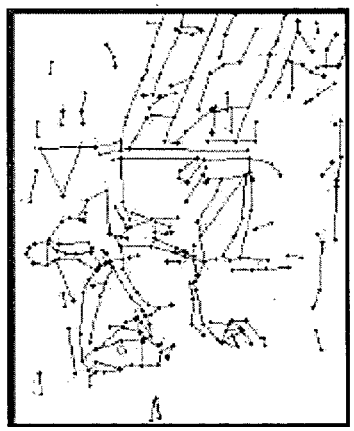
Figure 7C:

FIGS. 7A-7F illustrate an example of generating a synthesized image from an input image illustrated in FIG. 7A using the primal sketch model. A sketch graph $S_{sk}$ is computed from the input image as is illustrated in FIG. 7B. Each vertex and line segment of the sketch graph corresponds to an image primitive in the dictionary 10 of FIG. 3. These primitives are occluding image patches rather than linear additive bases as in the prior art. In other words, a single image patch is used to represent a single pixel instead of using overlapping bases.

The sketchable portion of the image is then synthesized by aligning the image primitives on the sketch graph of FIG. 7B.

Figure 7D:
Figure 7E:
Figure 7F:
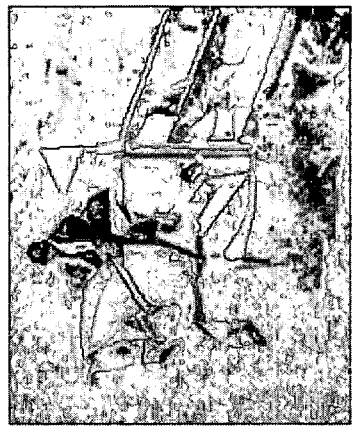

The remaining textural part is said to be non-sketchable, and is segmented into a small number of homogeneous texture regions as is illustrated in FIG. 7D. The statistics representing the texture impressions, such as the histograms of responses from a predefined set of filters, are extracted as the statistical summary on each texture region. The textures on the texture regions are then synthesized by simulating the MRF models which reproduce the statistical summaries in these regions as is illustrated in FIG. 7E. The MRF models interpolate the sketchable part of the image. Thus, the sketchable part is used as the boundary condition for the textures. The non-sketchable pixels are collected in $\Lambda_{nsk}$. The final synthesized image is shown in FIG. 7F which seamlessly integrates the sketchable and non-sketchable parts.

Figure 8:
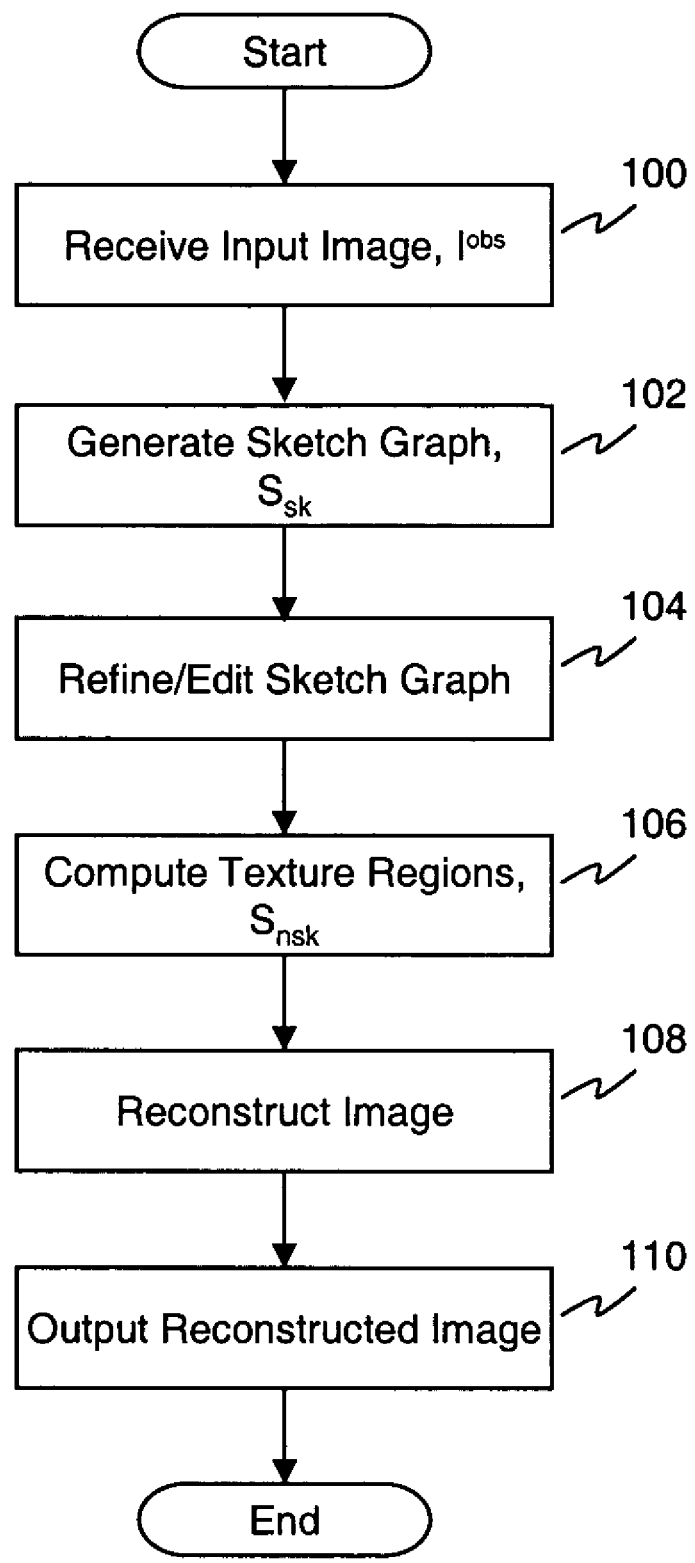
FIG. 8 is a flow diagram of a primal sketch algorithm for generating a primal sketch model according to one embodiment of the invention.

FIG. 8 is a flow diagram of a primal sketch algorithm for generating a primal sketch model according to one embodiment of the invention. The algorithm may be implemented by a processor executing computer program instructions stored in memory. In generating the primal sketch model, the process, in step 100, receives an input image, $I^{obs}$. The input image may be received via any input device conventional in the art.

In step 102, the process generates a sketch graph, $S_{sk}$, such as, for example, the sketch graph of FIG. 7B, for the sketchable part of the input image. The sketch graph is generated by sequentially adding new strokes to the graph that are most prominent. According to one embodiment, such strokes are primitives of edges or ridges.

In step 104, the process refines the sketch graph to achieve good Gestalt organization as defined by well-known Gestalt psychologists, and resolve ambiguities in the graph.

In step 106, the non-sketchable texture regions of the image, $S_{nsk}$, are computed via a simple texture clustering algorithm.

In step 108, the input image is reconstructed based on the primal sketch model, and the reconstructed image output in step 110 for display on a display. In reconstructing the sketchable part of the input image, the image primitives are aligned on the sketch graph. In reconstructing the non-sketchable part of the input image, the MRF models are simulated to reproduce statistical summaries of the various texture regions using the sketchable part as boundary condition.

The reconstructed image may also be efficiently transmitted to a recipient that has access to the dictionary of primitives 10. In this regard, the transmitting end transmits to a receiving device the sketch graph by transmitting the geometry and topology information, and the type of primitives. The texture information may also be transmitted if desired. The receiving end may then regenerate the sketch graph based on the received information and the dictionary of primitives.

Figure 9:
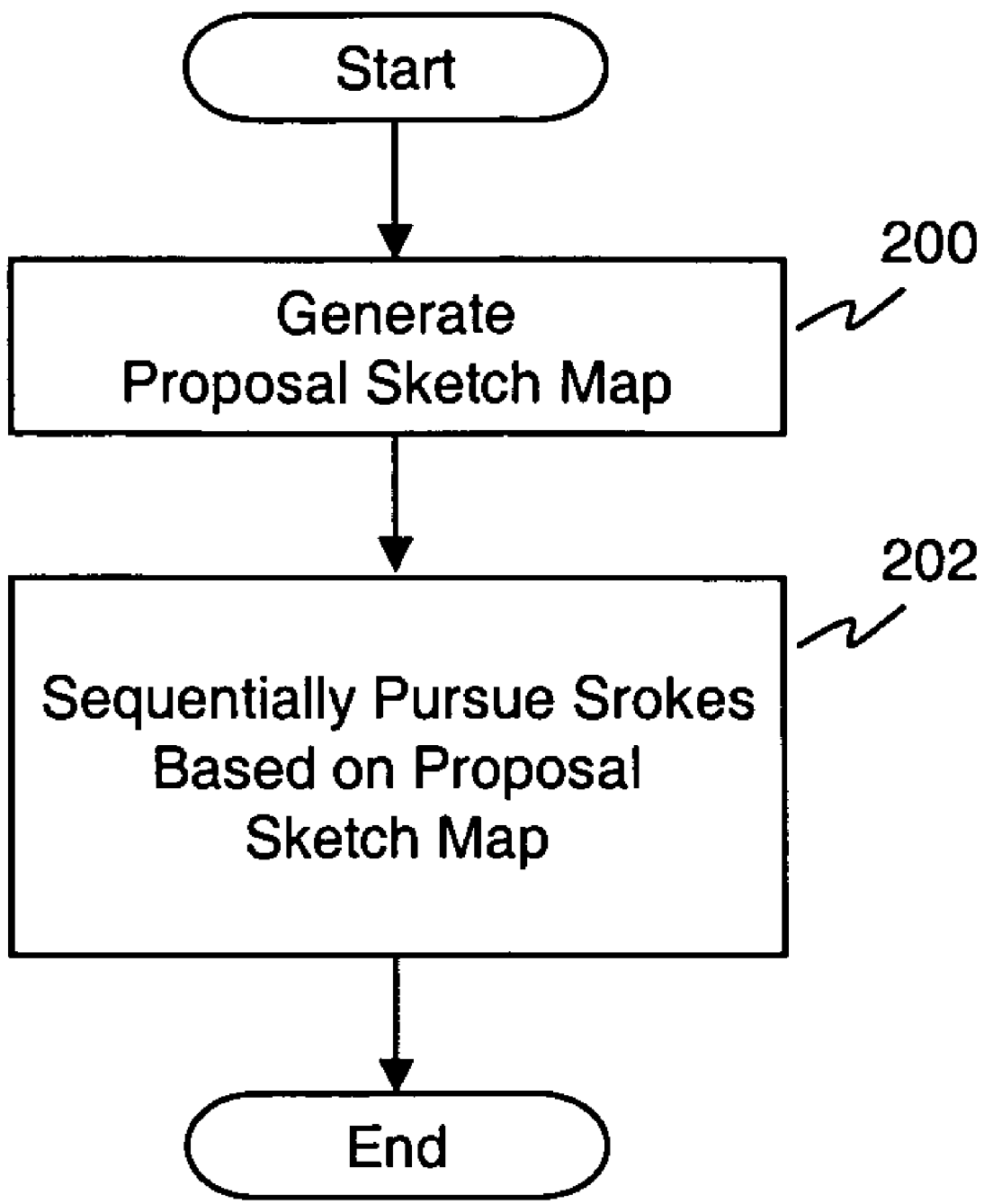
FIG. 9 is a flow diagram of a step of generating a sketch graph according to one embodiment of the invention.

FIG. 9 is a more detailed flow diagram of the step 102 of generating the sketch graph $S_{sk}$ according to one embodiment of the invention. In step 200, the process generates a proposal sketch map. In step 202, the process iteratively pursues optimal strokes from the proposal map and inserts it into the sketch graph $S_{sk}$. According to one embodiment of the invention, the strokes are added one by one so as to maximize the probability of the primal sketch model being maximized, or equivalently, to obtain highest image coding length gain (i.e., biggest reduction of the image code).

According to one embodiment, a simplified primal sketch probability model is sought to be maximized, and may be represented as follows:

$$p_I(I_\Lambda, S_{sk}, S_{nsk}; \Lambda_{sk}) \approx \qquad (12)$$

-continued $$\frac{1}{Z}\exp\left\{-\frac{1}{2\sigma_0^2}\left(\sum_{k=1}^{K}\sum_{(u,v)\in\Lambda_{sk,k}}(I(u,v)-B_k(u,v))^2 + \sum_{(u,v)\in\Lambda'_{nsk}}(I(u,v)-\mu(u,v))^2\right)\right\},$$

in which only imaging coding for the sketchable part $\Lambda_{sk}$ is kept, the prior models on $S_{sk}$ and $S_{nsk}$ are ignored, and a simple Gaussian model is applied to the pixels in the texture regions $\Lambda_{nsk}$. $\mu(u, v)$ is the local intensity mean around pixel $(u, v)$. From the simplified model, when a stroke $S_{sk,K+1}$ is added into $S_{sk}$, then $S_{sk}'=S_{sk}\cup S_{sk,K+1}$, $\Lambda_{nsk}'=\Lambda_{nsk}-\Lambda_{sk,K+1}$ and the probability changes to:

$$p_I(I_\Lambda, S'_{sk}, S'_{nsk}; \Delta_{sk}) \approx \quad (13)$$

$$\frac{1}{Z}\exp\left\{-\frac{1}{2\sigma_0^2}\left(\sum_{k=1}^{K+1}\sum_{(u,v)\in\Lambda_{sk,k}}(I(u,v)-B_k(u,v))^2 + \sum_{(u,v)\in\Lambda'_{nsk}}(I(u,v)-\mu(u,v))^2\right)\right\}$$

An image coding length gain $\Delta L$ due to adding a new stroke may be defined based on the above equations as follows:

$$\Delta L = \log\frac{p(I_\Lambda, S'_{sk}, S'_{nsk}; \Delta_{sk})}{p(I_\Lambda, S_{sk}, S_{nsk}; \Delta_{sk})} \quad (14)$$

$$= \frac{1}{2\sigma_0^2}\left\{\sum_{(u,v)\in\Lambda_{sk,K+1}}(I(u,v)-\mu(u,v))^2 - (I(u,v)-B_{(K+1)}(u,v))^2\right\}$$

Figure 10:
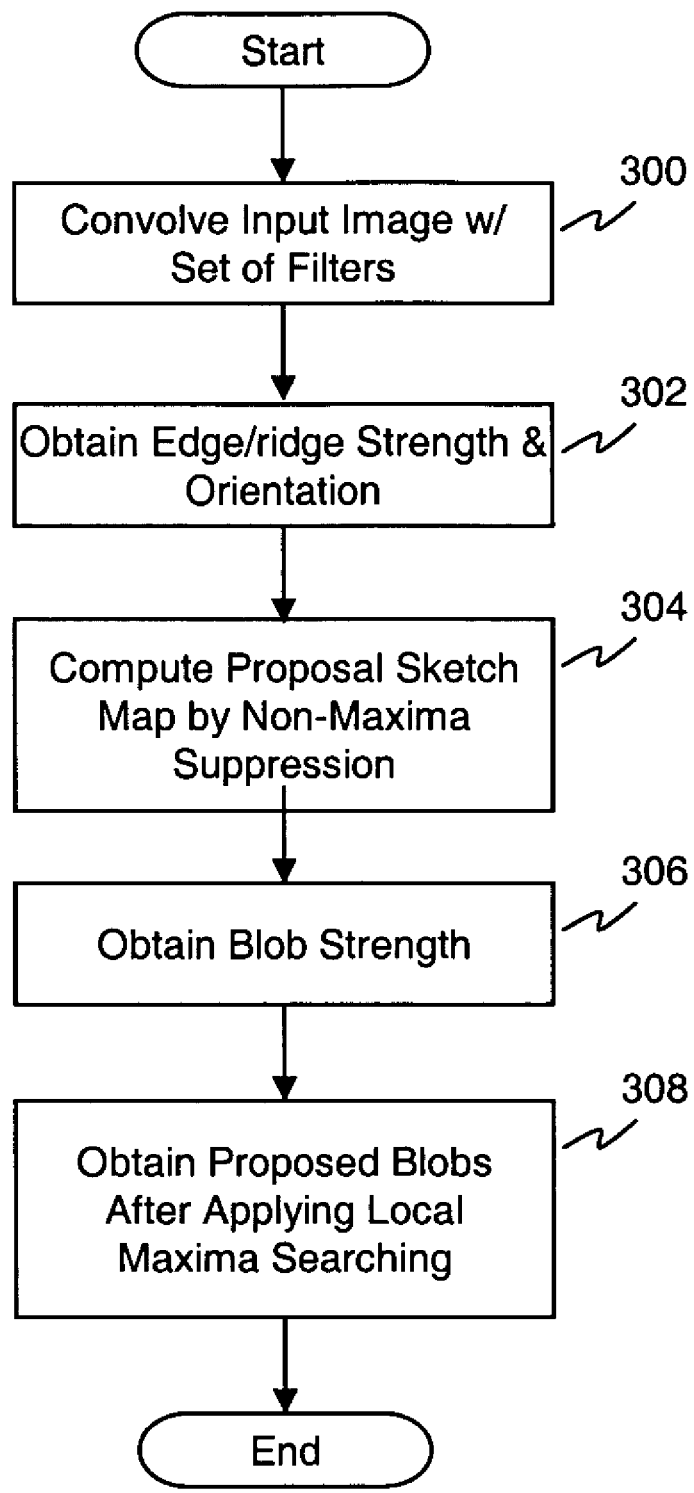
FIG. 10 is a flow diagram of a step of generating a proposal sketch map according to one embodiment of the invention.

FIG. 10 is a more detailed flow diagram of the step 200 of generating the proposal sketch map according to one embodiment of the invention. In step 300, the input image is convolved with a set of predefined filters. The filters may include, for example, Laplacian of Gaussian (LoG) filters, elongated filters of a first derivative of the Gaussian filter (DG), and/or elongated filters of a second derivative of the Gaussian filter (D2G), which are well known to those of skill in the art. DG and D2G filters may be chosen at several scales (e.g. three to five) and a number of orientations (e.g. 18) to detect edges and ridges. Edges in images are areas with strong intensity contrasts (i.e. a jump in intensity from one pixel to the next). Blobs may be detected by using several scales of the LoG filters.

In step 302, the process detects the edges of the input image by obtaining for each pixel, the edge/ridge strength and orientation at that pixel. In this regard, the process computes the combined response of the DG and D2G filters, which is the sum of the squares of DG and D2G responses. The maximum of the combined responses is considered as the edge/ridge strength at that pixel. According to one embodiment, the orientation of the edge/ridge is determined by the orientation of the maximum response filter.

In step 304, the process computes the proposal sketch graph via a non-maxima suppression method. The non-maxima suppression method is described in further detail by Canny, "A Computational Approach to Edge Detection," *IEEE Trans. on Pattern Analysis and Machine Intelligence*, 8:679-698, 1986, the content of which is incorporated herein by reference. In general terms, non-maxima suppression is used to trace along the edge in the detected edge direction and suppress any pixel value (sets it equal to 0) that is not considered to be an edge. This generates a thin line in the output image. The non-maxima suppression method thus effectively computes the maxima as the proposed sketch.

In step 306, the process measures the blob strength by the maximum responses of the LoG filters. In step 308, the proposed blobs are obtained after applying local maxima searching.

Figure 11:
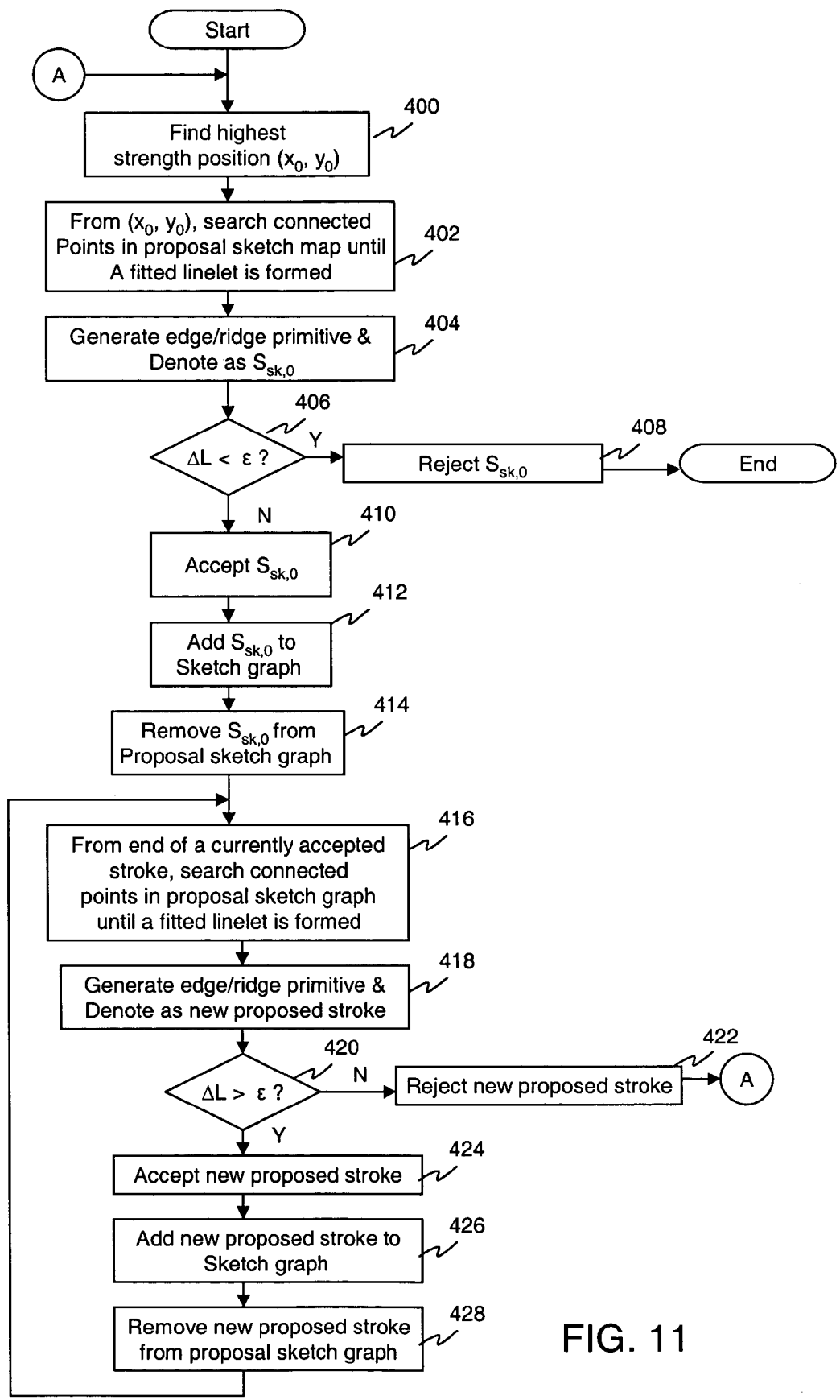
FIG. 11 is flow diagram of a step of sequentially adding strokes to the sketch graph based on the proposed sketch map according to one embodiment of the invention.

FIG. 11 is a more detailed flow diagram of the step 202 of sequentially adding strokes to the sketch graph based on the proposed sketch map according to one embodiment of the invention. In step 400, the process finds the highest strength position $(x_0, y_0)$ from the proposal sketch map. In step 402, the points connected to position $(x_0, y_0)$ are collected in two directions of the line segment until a straight line segment is formed within a pre-specified average fitting error per pixel, such as, for example, 1:0 per pixel. An optimal edge/ridge primitive is then generated after geometric transformations (warpping) and photometric parameter fitting of the chosen primitive in step 404. The generated primitive is denoted as $S_{sk,0}$.

In step 406, a determination is made as to whether the amount of image coding length gained due to the introduction of the new stroke is less than a pre-specified threshold, that is, whether $\Delta L < \epsilon$. If the answer is YES, the proposed stroke $S_{sk,0}$ is rejected in step 408. Otherwise the proposed stroke is accepted in step 410, and in step 412, the proposed stroke is added to the sketch graph: $S_{sk} \leftarrow S_{sk} \cup S_{sk,0}$. This operation is referred to as a "creation," and defined as a graph operator $O_1$ illustrated in FIG. 12.

In step 414, the stroke $S_{sk,0}$ is removed from the proposal sketch map.

In step 416, a determination is made as to whether the coding length gained is bigger than a predetermined threshold. If the answer is NO, the new proposed stroke is rejected in step 422. Otherwise, it is accepted in step 424, and added to the sketch graph in step 426. This operation may be referred to as "growing," and is defined as graph operator $O_2$ in FIG. 12. Graph operator $O_2$ may be applied iteratively until no proposal is accepted. Then a curve (with one or several strokes, two terminators and possible corners) is obtained. In step 428, the newly accepted stroke is removed from the proposal sketch graph.

In step 420, a determination is made as to whether the coding length gained is bigger than a predetermined threshold. If the answer is NO, the new proposed stroke is rejected in step 422. Otherwise, it is accepted in step 424, and added to the sketch graph in step 426. This operation may be referred to as "growing," and is defined as graph operator $O_2$ in FIG. 12. Graph operator $O_2$ may be applied iteratively until no proposal is accepted. Then a curve (with one or several strokes, two terminators and possible corners) is obtained. In step 428, the newly accepted stroke is removed from the proposal sketch graph.

According to one embodiment of the invention, the process applies the graph operators $O_1$ and $O_2$ iteratively until no more strokes are accepted.

Figure 2A:
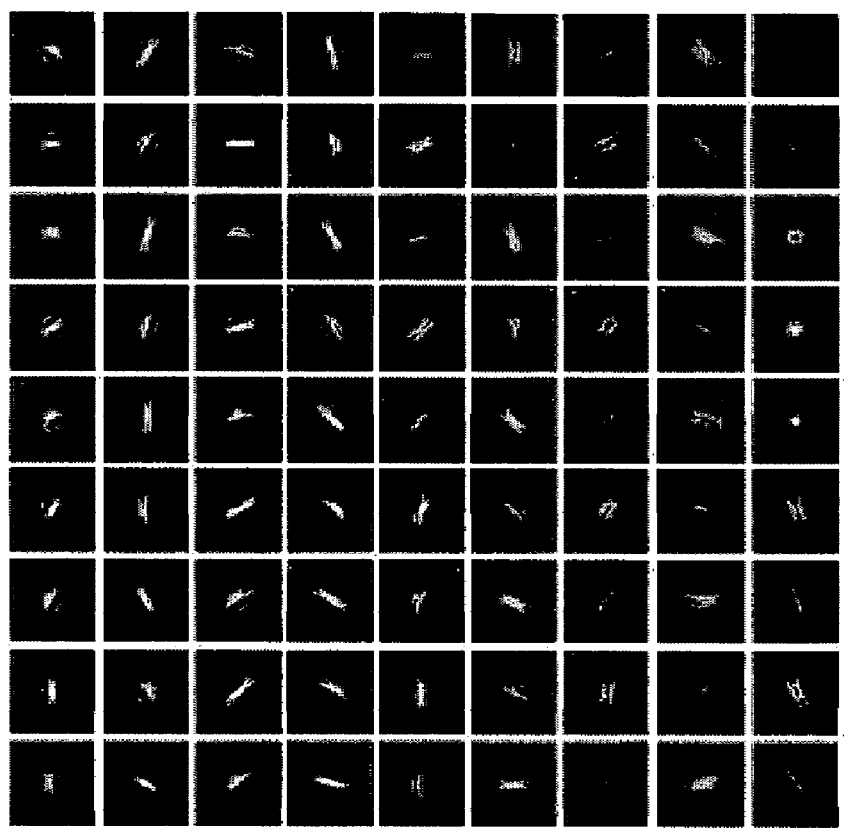
FIG. 2A illustrates a typical dictionary of bases used in the prior art.
Figure 2D:
FIG. 2D is a symbolic representation of the input image of FIG. 2B.
Figure 2C:
FIG. 2C illustrates the image reconstructed via sparse coding using bases selected from the dictionary of FIG. 2A.
Figure 2B:
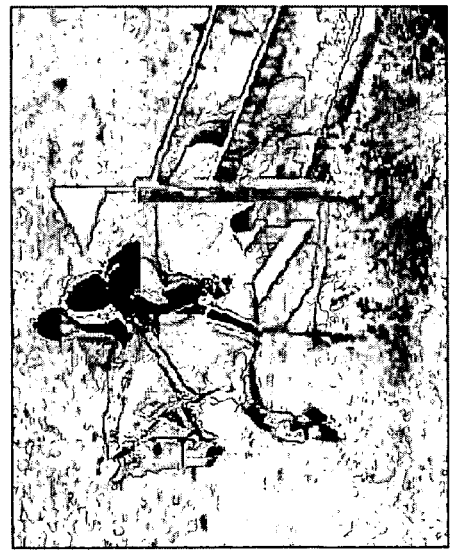
FIG. 2B illustrates an input image to which sparse coding is applied.
Figure 13A:
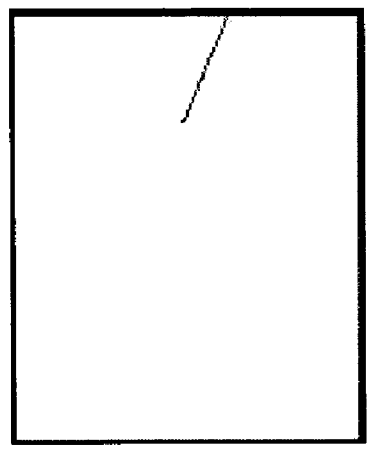
FIGS. 13A-13F depict the sketch graph after respectively 1, 10, 20, 50, 100, and 150 iterations of the graph operators of FIG. 12.
Figure 13B:
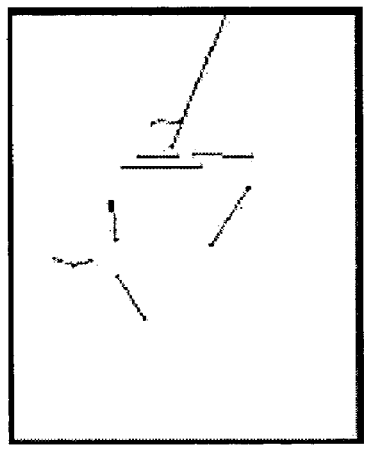
Figure 13C:
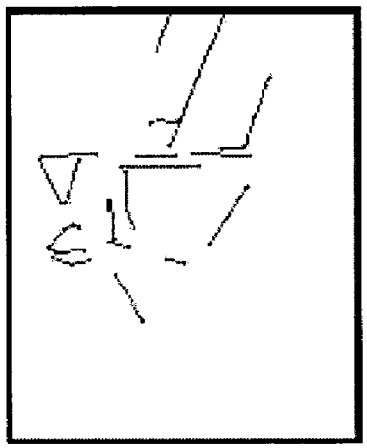
Figure 13D:
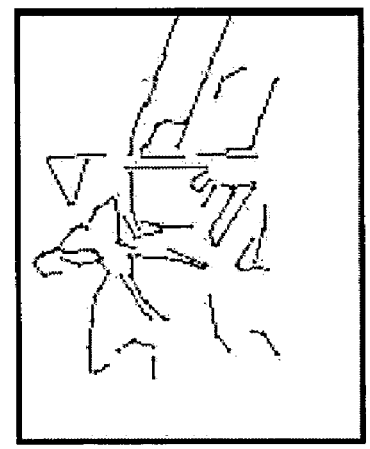
Figure 13E:
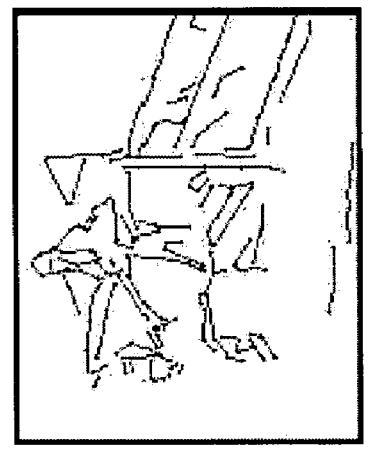
Figure 13F:
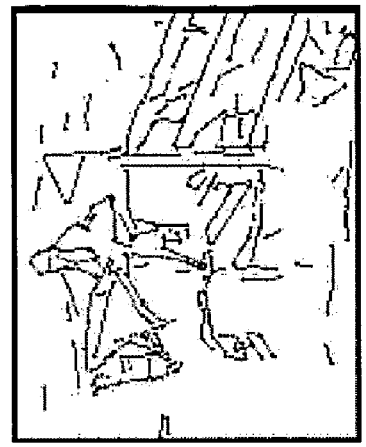

FIGS. 13A-13F illustrates the results of the process of FIG. 11 when applied to the input image of FIG. 2B according to one embodiment of the invention. FIG. 13A depicts the sketch graph after one iteration of the $O_1$ and $O_2$ graph operators.

FIGS. 13B-13F depict the sketch graph after respectively 10, 20, 50, 100, and 150 iterations of the graph operators.

Figure 14:
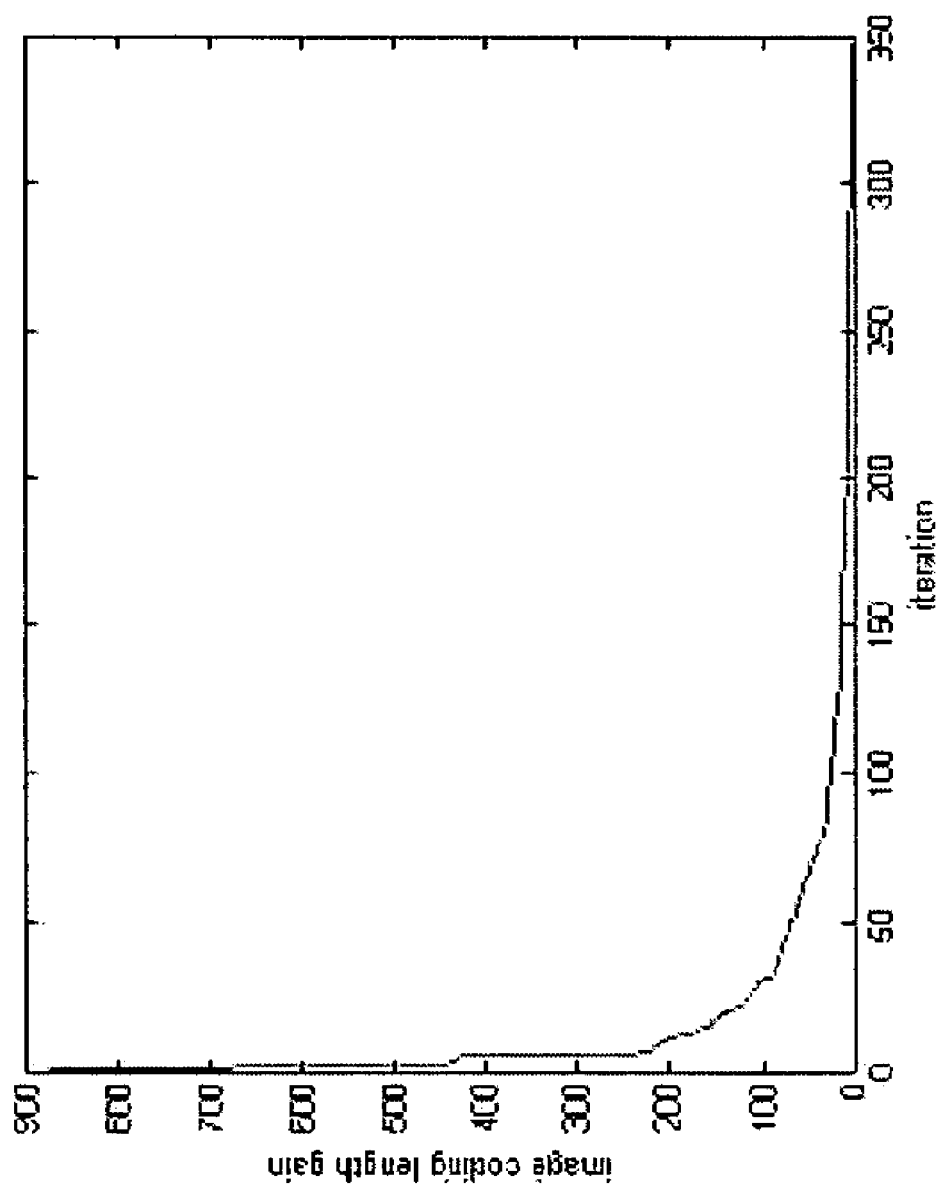
FIG. 14 illustrates a graph that plots an image coding length gain $\Delta L$ for each iteration of the graph operators for the sketch graph of FIGS. 13A-13F.

FIG. 14 illustrates a graph that plots the image coding length gain ΔL for each iteration of the graph operators for the sketch graph of FIGS. 13A-13F. As depicted in the graph, the gain is most significant during the initial stages of the iteration.

Figure 16:
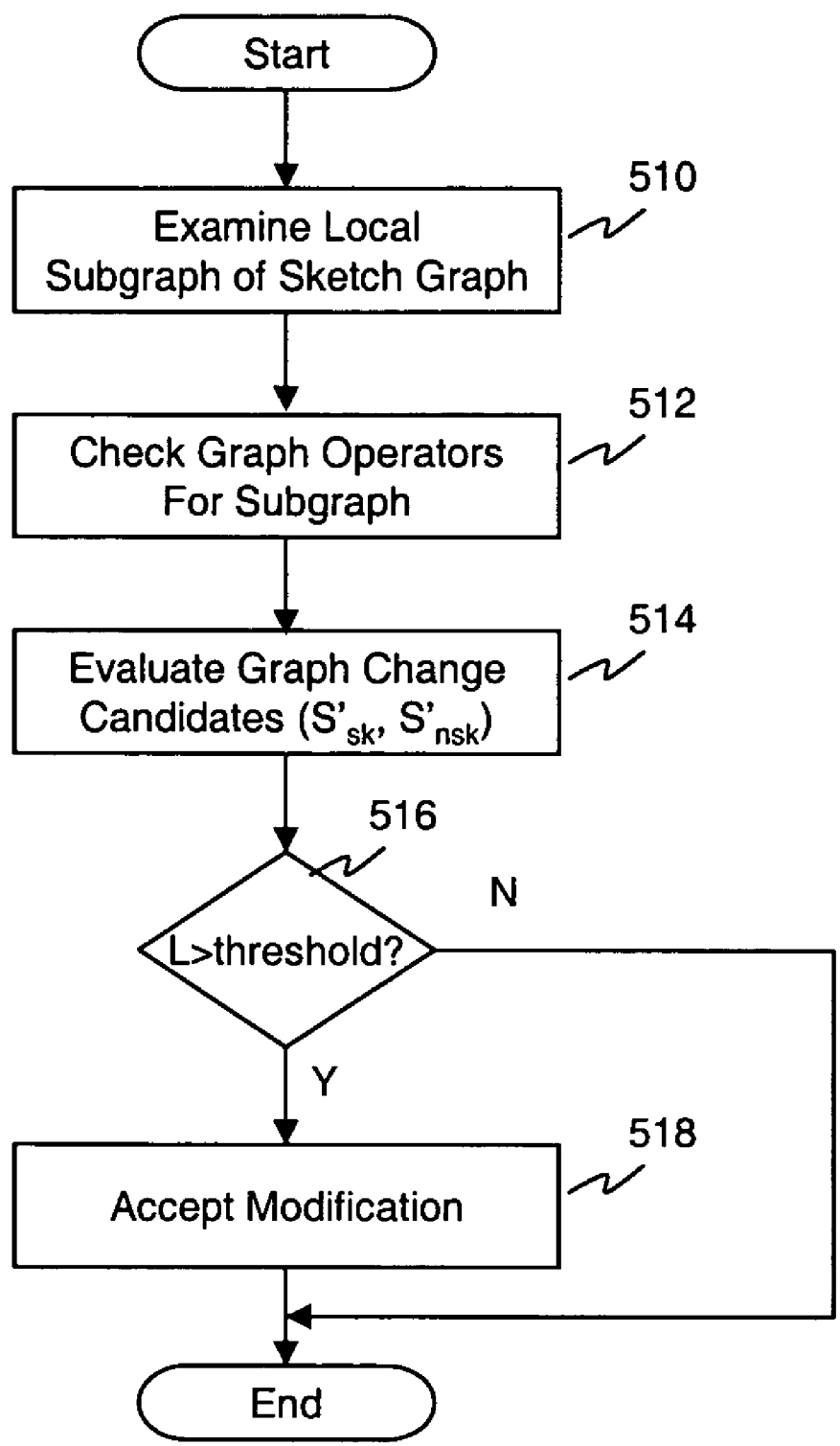
FIG. 16 is a flow diagram of a step of refining sketch graph according to one embodiment of the invention.

FIG. 16 is a more detailed flow diagram of the step 104 of refining the sketch graph $S_{sk}$ according to one embodiment of the invention. The sketch graph generated in step 102 is edited during this stage based on one or more graph operations illustrated in FIG. 12 to achieve better Gestalt (spatial) organization and resolve ambiguities around the vertices of the graph. A particular graph operation, or series of operations, is accepted if it results in a decrease of the coding length. In this regard, the process of refining the sketch graph maximizes a simplified version of the joint probability of equation (10).

$$p_{II}(I_\Lambda, S_{sk}, S_{nsk}; \Delta_{sk}) \approx \qquad (15)$$

$$\frac{1}{Z}\exp\left\{-\frac{1}{2\sigma_0^2}\left(\sum_{k=1}^K \sum_{(u,v)\in\Lambda_{sk,k}} (I(u,v) - B_k(u,v))^2 + \sum_{(u,v)\in\Lambda_{nsk}} (I(u,v) - \mu(u,v))^2\right) - E(S_{sk})\right\},$$

According to equation (15), the image coding for the sketchable part $\Lambda_{sk}$ and the prior model on $S_{sk}$ are kept. The prior model on $S_{nsk}$ is ignored, and a simple Gaussian model is applied to the pixels in the texture regions $\Lambda_{nsk}$ as in the sketch graph generation stage.

The sketch refining process may be described as maximizing a posterior (MAP) probability as follows:

$$(S_{sk}, S_{nsk})^* = \arg\max p_{II}(S_{sk}, S_{nsk}|I_\Lambda; \Delta_{sk}) \qquad (16)$$

$$= \arg\max p_{II}(I_\Lambda, S_{sk}, S_{nsk}; \Delta_{sk}) \qquad (17)$$

$$= \arg\min \frac{1}{2\sigma_0^2}\sum_{K=1}^K \sum_{(u,v)\in\Lambda_{sk,k}} (I(u,v) - B_k(u,v))^2 + \sum_{(u,v)\in\Lambda_{nsk}} (I(u,v) - \mu(u,v))^2 + E(S_{sk})$$

$$= \arg\min L_A + L_S$$

$$= \arg\min L(S_{sk}, S_{nsk}) \qquad (18)$$

where $$L_A = \frac{1}{2\sigma_0^2}\left(\sum_{k=1}^K \sum_{(u,v)\in\Lambda_{sk,k}} (I(u,v) - B_k(u,v))^2 + \sum_{(u,v)\in\Lambda_{nsk}} (I(u,v) - \mu(u,v))^2\right)$$

is referred to as the image coding length, $L_S = E(S_{sk})$ is referred to as the sketch coding length, and $L(S_{sk}, S_{nsk}) = L_A + L_S$ is called the total coding length.

Referring again to FIG. 12, it depicts a table that summarizes a set of reversible graph operators according to one embodiment of the invention. As described above with reference to FIG. 11, graph operator $O_1$ is referred to as a creating operator, and seeks to create a new stroke. Graph operator $O_2$ is referred to as a growing operator, and seeks to grow an existing stroke. Both of these graph operators are reversible. The reverse of $O_1$ is $O'_1$, and seeks to remove a stroke. The reverse of $O_2$ is $O'_2$, and seeks to shrink a stroke.

Graph operator $O_3$ is referred to as a connection operator, and connects two vertices by a new stroke. In this regard, a set of nearest neighbors for each vertex $S_{sk,k}$ is found. The connection operator then proposes to connect each of the neighbors to $S_{sk,k}$ by introducing a new stroke. The operator $O_3$ is repeatedly checked for all possible connections. The reverse operation $O'_3$ disconnects two vertices by removing a connecting stroke.

Graph operators $O_4$ and $O_5$ are respectively called extension and cross operators. These operators respectively extend one (O2) or two (O3) existing strokes, and check if they are crossed with other strokes to form junctions (O4) or corners (O5). In this situation, one new vertex and one or two more new strokes may be proposed. The reverse operators $O'_4$ and $O'_5$ disconnect vertices by respectively removing one or two strokes.

Graph operators $O_6$ and $O_7$ are called combination operators, and respectively combine two connected strokes ($O_6$) or parallel strokes ($O_7$) into one. The reverse operators $O'_6$ and $O'_7$ break or split a stroke into two.

Graph operator $O_8$, referred to as a merging operator, merges two nearby vertices into one, effectively removing one stroke and one vertex. The reverse operator $O'_8$ seeks to split one vertex into two.

Graph operator $O_9$ creates a blob, and graph operator $O_{10}$ changes one or more strokes into a blob. The reverse operations $O'_9$ and $O'_{10}$ respectively remove a blob and change a blob into a stroke.

The geometric and photometric properties of the sketch graph are modified by a graph operation referred to as a diffusion operator. The diffusion operator changes properties such as the vertex position, and the stroke profiles. For example, to defuse the positions of the vertices represented by the primitives, the position (x, y) is perturbed in an area of [x±dx, y±dy], and the position with the highest coding length gain is selected.

Figure 15:
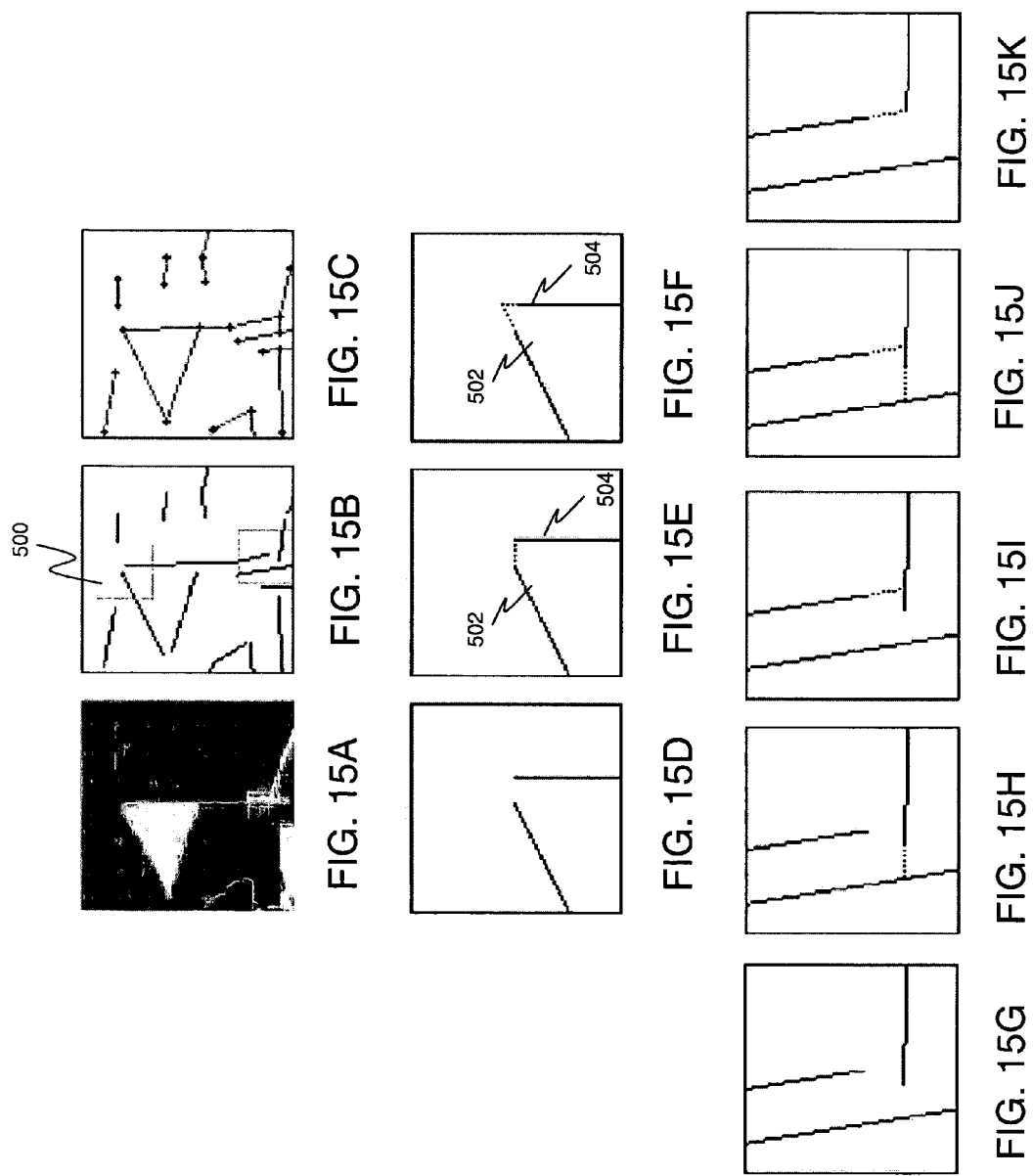
FIGS. 15A-15K illustrate application of graph operators for editing a sketch graph according to one embodiment of the invention.

FIGS. 15A-15K illustrate the application of graph operators for editing a sketch graph according to one embodiment of the invention. FIG. 15A illustrates a local image patch for the image illustrated in FIG. 7A. FIG. 15B illustrates a sketch graph generated according to step 102 of FIG. 9. FIG. 15C illustrates the sketch graph after being refined via the graph operators of FIG. 12.

Specifically, in refining subgraph 500 illustrated in FIG. 15D which corresponds to the upper rectangle of the sketch graph, graph operator $O_3$ may be applied as is illustrated in FIG. 15E to connect the two vertices 502 and 504. Alternatively, graph operator $O_5$ may be applied as is illustrated in FIG. 15F to extend the two vertices 502 and 504 and cross. According to one embodiment, the graph operator that most minimizes the code length is accepted for modifying the sketch graph.

Referring now to the process of FIG. 16, a local subgraph of the sketch graph is examined in step 510. In step 512, the process applies the graph operators illustrated in FIG. 12 for the subgraph around "dangling" line segments that have one open end. In step 514, the process evaluates the graph change candidates $(S'_{sk}, S'_{nsk})$ provided by the graph operators in terms of total coding length gain $\Delta L = L(S_{sk}, S_{nsk}) - L(S'_{sk}, S'_{nsk})$. According to one embodiment of the invention, a greedy method is adopted where, based on a determination in step 516 that ΔL is greater than a predetermined threshold, the local subgraph is modified in step 518 by accepting the modifications made by the graph change candidates. The process of FIG. 16 is repeated until no modification can be accepted.

Figure 17:
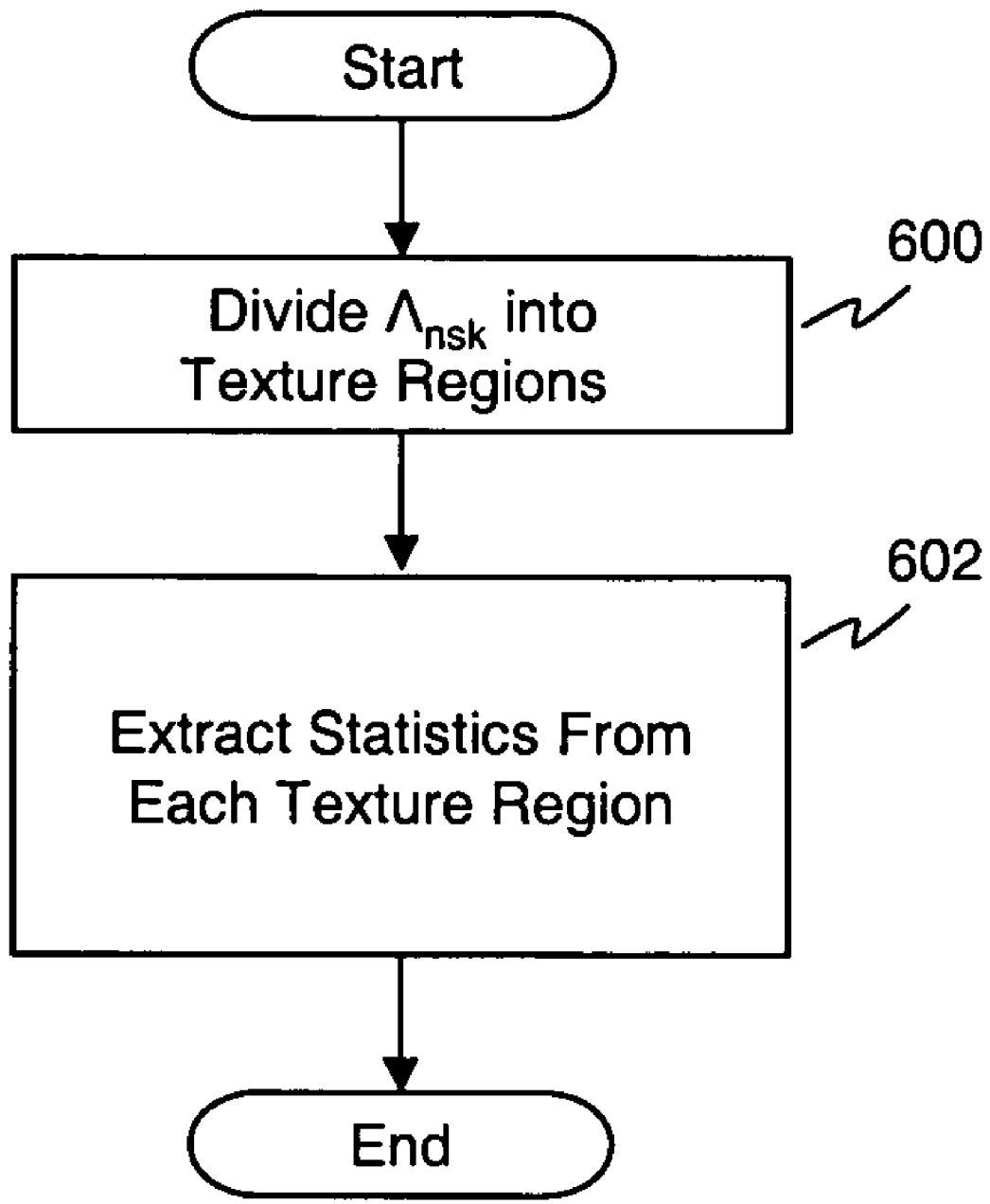
FIG. 17 is a more detailed flow diagram of a step of computing texture regions according to one embodiment of the invention.

FIG. 17 is a more detailed flow diagram of the step 106 of computing the texture regions $S_{nsk}$ according to one embodiment of the invention. In step 600, the lattice $\Lambda_{nsk}$ for the textures is divided into one or more texture regions using a clustering mechanism. According to one embodiment of the invention, a texture feature h(u, v) which is chosen for doing the clustering is a histograpm of a set of pre-selected filters within a local window (e.g. 7×7). For example, if seven filters and seven bins are used for each of the filter response histogram, this results in a 49-dimensional feature h(u, v) for each pixel (u, v) in $\Lambda_{nsk}$. Because the filters are limited to small window sizes, and the filters have small responses, it is computationally less expensive to simulate the textures.

According to one embodiment of the invention, the clustering is achieved in a process of maximizing a posterior (MAP).

$$S_{nsk}^* = \arg\max p(S_{nsk} | I_{\Lambda_{nsk}})$$

$$= \arg\max p(I_{\Lambda_{nsk}} | S_{nsk}) p(S_{nsk})$$

$$= \arg\min \sum_{m=1}^{M} E(I_{\Lambda_{nsk,m}} | S_{nsk,m}) + E(S_{nsk}),$$

$$E(I_{\Lambda_{nsk,m}} | S_{nsk,m}) = -\frac{1}{2}\log|\sum_m| - \frac{1}{2}\sum_{(u,v) \in \Lambda_{nsk,m}} (h(u,v) - h_m)^T \sum_m^{-1} (h(u,v) - h_m), \quad (20)$$

(19)

where $E(S_{nsk})$ is a simple energy on $S_{nsk}$ that follows a Potts model as described in further detail in Guo et al., "Visual Learning by Integrating Descriptive and Generative Methods," *Proc. 8th ICCV*, 2001, the content of which is incorporated herein by reference. The texture regions are modeled by multivariate Gaussian with the mean $h_m$ and the covariance $\Sigma_m$ for region $\Lambda_{nsk,m}$.

After the texture regions are obtained, a FRAME model is available for each region, and the process, in step 602, draws samples from the FRAME models, that is, extracts the statistics of the histograms as the statistical summary, to synthesize textures. The textures on these regions are synthesized by simulating the MRF models which reproduce the statistical summary in these regions. The MRF models interpolate the sketchable part of the image.

Table 1 counts the number of parameters for describing the primal sketch model presented in FIG. 7F according to the embodiments described above.

TABLE 1

|  | coding description | coding length (bits) |
| --- | --- | --- |
| Sketch graph | vertices 152 | 152 * 2 * 9 = 2,736 |
|  | strokes (275) | 275 * 2 * 4.7 = 2,585 |
| Sketch image | profiles (275) | 275 * (2.4 * 8 + 1.4 * 2) = 6,050 |
| Total for sketchable | 18,185 pixels | 11,371 bits = 1,421 bytes |
| Region boundaries | 3659 pixels | 3659 * 3 = 10,977 |
| MRF parameters | texture regions (7) | 7 * 5 * 13 * 4.5 = 2,048 |
| Total for non-sketchable | 41,815 pixels | 13,025 bits = 1,628 bytes |
| Total for whole image | 72,000 pixels | 3,049 bytes, 0.04 byte/pixel |

The input image illustrated in FIG. 7A is of 300×240 pixels, of which 18,185 pixels (around 25%) are considered by the primal sketch model as being sketchable. The sketch graph has 152 vertices and 275 edges/ridges, and the attributes are coded by 1,421 bytes. This allows the non-sketchable pixels to be represented by 455 parameters or less. In the illustrated example, the parameters are 5 filters for 7 texture regions, and each pools a 1D histogram of filter responses into 13 bins. Together with the codes for the region boundaries, the total coding length for the textures is 1,628 bytes. The total coding length for the synthesized image in FIG. 7F is 3,049 bytes or 0.04 bytes per pixel. The primal sketch model thus provides a 1:25 compression ratio when compared to JPG2000. It should be noted that the coding length is roughly computed here by treating the primitives as being independent. If the dependence in the graph is accounted for, and some arithmetic compression scheme is employed, a higher compression rate may be achieved.

In summary, the primal sketch model described according to the above embodiments provides sketch graphs that capture the main structures in the image while the leftover textures are modeled perceptually well by MRF models.

While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof.

In view of the above it will be understood that the invention is not limited to the particular embodiments or arrangements disclosed, but is rather intended to cover any changes, adaptations or modifications which are within the scope and spirit of the invention as defined by the appended claims and their equivalents.

What is claimed is:

1. A computer-implemented method for reconstructing an input image including a sketchable portion and a non-sketchable portion, the method comprising:

receiving the input image under control of the computer;

iteratively selecting, under control of the computer, a plurality of optimal image primitives from a dictionary of image primitives and generating a sketch graph of the sketchable portion of the image;

automatically editing, under control of the computer, the sketch graph for resolving ambiguities;

automatically obtaining, under control of the computer, one or more texture regions associated with the non-sketchable portion of the image;

extracting, under control of the computer, statistical summaries associated with the one or more texture regions;

automatically reconstructing, under control of the computer, the image based on the sketch graph and the extracted statistical summaries; and outputting, under control of the computer, the reconstructed image.

2. The method of claim 1, wherein the sketchable portion is a structural portion of the image, and the non-sketchable portion is a texture portion of the image.

3. The method of claim 1, wherein the generating of the sketch graph includes:

generating a proposal sketch map; and iteratively generating strokes on the sketch graph based on the proposal sketch map.

4. The method of claim 3, wherein the generating of the proposal sketch map includes:

detecting edges of the input image; and tracing along the edge to generate a line.

5. The method of claim 3, wherein the generating of the strokes on the sketch graph includes:

selecting a candidate primitive from the dictionary;

determining an image coding length gain associated with the candidate primitive; and accepting or rejecting the candidate primitive based on the determination.

6. The method of claim 1, wherein each of the plurality of optimal image primitives is associated with geometric and photometric properties.

7. The method of claim 6, wherein the sketch graph is composed based on the geometric properties.

8. The method of claim 6, wherein the image primitives in the dictionary are indexed based on the geometric properties.

9. The method of claim 1, wherein a single image primitive represents a single pixel of the input image.

10. The method of claim 1, wherein the editing of the sketch graph comprises:

applying a graph operator to a line segment on the sketch graph having an open end;

determining an image coding length gain associated with the graph operator; and accepting or rejecting a change provided by the graph operator based on the determination.

11. The method of claim 10, wherein the graph operator connects two line segments in the sketch graph.

12. The method of claim 1, wherein each texture region is generated via a clustering of a plurality of filter responses generated based on the input image.

13. The method of claim 1, wherein the non-sketchable portion of the image is synthesized via a texture model using the sketchable portion of the image as a boundary condition.

14. A system for reconstructing an input image including a sketchable portion and a non-sketchable portion, the system comprising:

an input receiving the input image;

a data store storing a dictionary of image primitives;

a processor; and a memory coupled to the processor and having program instructions stored therein, the processor being operable to execute the program instructions, the program instructions including:

iteratively selecting a plurality of optimal image primitives from the dictionary of image primitives and generating a sketch graph of the sketchable portion of the image;

automatically editing the sketch graph for resolving ambiguities;

automatically obtaining one or more texture regions associated with the non-sketchable portion of the image;

extracting statistical summaries associated with the one or more texture regions;

automatically reconstructing the image based on the sketch graph and the extracted statistical summaries; and outputting the reconstructed image.

15. The system of claim 14, wherein the sketchable portion is a structural portion of the image, and the non-sketchable portion is a texture portion of the image.

16. The system of claim 14, wherein the program instructions generating the sketch graph further include program instructions:

generating a proposal sketch map; and iteratively generating strokes on the sketch graph based on the proposal sketch map.

17. The system of claim 16, wherein the program instructions generating the proposal sketch map further include program instructions:

detecting edges of the input image; and tracing along the edge to generate a line.

18. The system of claim 16, wherein the program instructions generating the strokes on the sketch graph further include program instructions:

selecting a candidate primitive from the dictionary;

determining an image coding length gain associated with the candidate primitive; and accepting or rejecting the candidate primitive based on the determination.

19. The system of claim 14, wherein each of the plurality of optimal image primitives is associated with geometric and photometric properties.

20. The system of claim 19, wherein the sketch graph is composed based on the geometric properties.

21. The system of claim 19, wherein the image primitives in the dictionary are indexed based on the geometric properties.

22. The system of claim 14, wherein a single image primitive represents a single pixel of the input image.

23. The system of claim 14, wherein the program instructions editing the sketch graph further include program instructions:

applying a graph operator to a line segment on the sketch graph having an open end;

determining an image coding length gain associated with the graph operator; and accepting or rejecting a change provided by the graph operator based on the determination.

24. The system of claim 23, wherein the graph operator connects two line segments in the sketch graph.

25. The system of claim 14, wherein each texture region is generated via a clustering of a plurality of filter responses generated based on the input image.

26. The system of claim 14, wherein the non-sketchable portion of the image is synthesized via a texture model using the sketchable portion of the image as a boundary condition.

27. A computer readable media embodying program instructions for execution by a data processing apparatus, the program instructions reconstructing an input image including a sketchable portion and a non-sketchable portion, the program instructions comprising:

iteratively selecting a plurality of optimal image primitives from a dictionary of image primitives and generating a sketch graph of the sketchable portion of the image;

automatically editing the sketch graph for resolving ambiguities;
automatically obtaining one or more texture regions associated with the non-sketchable portion of the image;
extracting statistical summaries associated with the one or more texture regions;

automatically reconstructing the image based on the sketch graph and the extracted statistical summaries; and
outputting the reconstructed image.

* * * * *